United States Patent [19]

Veré et al.

[11] Patent Number: 4,587,394
[45] Date of Patent: May 6, 1986

[54] DEVICE AND METHOD OF WELDING NUCLEAR FUEL ASSEMBLY STRUCTURAL ELEMENTS

[76] Inventors: Bernard Veré, 2 les Chusets Brie et Angonne, 38320 Eybens; Maura Biryoukoff, Alléd du Mathias, 69760 Limonest, both of France

[21] Appl. No.: 532,929

[22] Filed: Sep. 16, 1983

[30] Foreign Application Priority Data

Sep. 16, 1982 [FR] France .................................. 82 15663

[51] Int. Cl.⁴ ............................................. B23K 11/32
[52] U.S. Cl. .................................. 219/67; 219/86.61; 219/86.7; 219/90; 219/91.2
[58] Field of Search ................. 219/86.1, 86.25, 86.31, 219/86.61, 86.7, 91.2, 90, 59.1, 67

[56] References Cited

U.S. PATENT DOCUMENTS 2,883,517  4/1959  Rice et al. ........................... 219/86.1
3,920,950  11/1975  Caprioglio ............................ 219/90

FOREIGN PATENT DOCUMENTS

2610216  9/1977  Fed. Rep. of Germany ........ 219/90

Primary Examiner—C. L. Albritton
Assistant Examiner—Alfred S. Keve
Attorney, Agent, or Firm—Pollock, Vande Sande & Priddy

[57] ABSTRACT

Device and method for welding nuclear fuel assembly structural elements, comprising a receiving stand for the guide tubes and structural elements of the assembly, and a welding group having a carriage movable parallel to the guide tubes comprising at least one welding gun united on the carriage by means enabling it to move parallel to a row of guide tubes and to rotate between an orientation in which the gun can pass between two adjacent rows of guide tubes and an orientation in which it comes to grip a tube at the location of the proposed weld, electrical welding pulses being applied to the guns.

11 Claims, 12 Drawing Figures

DEVICE AND METHOD OF WELDING NUCLEAR FUEL ASSEMBLY STRUCTURAL ELEMENTS

FIELD OF THE INVENTION

The invention relates to the welding of structural elements to constitute the skeleton of fuel assemblies for nuclear reactors.

BACKGROUND OF THE INVENTION

It is known that many fuel assemblies for power reactors, and particularly for light water reactors, comprise a skeleton constituted by a rigid structure formed by a bundle of guide tubes joining two end pieces and on which grids are fixed are regular intervals. These grids support end brace pencils each formed by a stack of pellets of fuel material in a cylindrical sheath. The major portion of the guide tubes are generally distributed in rows arranged along two perpendicular directions. An assembly of this type is described, for example, in French Pat. No. 2,049,108.

The skeleton of a fuel assembly must be so mounted as to avoid the appearance of stresses or of weak points, sources of welding ruptures. The fixing of the inner guide tubes to the grids is moreover very inconvenient, due to the difficulty of access into the bundle. In the past, the guide tubes were fixed to the grids by welding when the constituent materials of the guide tubes and of the plates constituting the grids were compatible. However the manual forming of welds on four longitudinal lines of each guide tube in contact with the plates represents very long, troublesome operation of uncertain reliability, due to the difficulties of correctly positioning the welding tool.

OBJECT OF THE INVENTION

It is an object of the invention to provide an improved method and device for fixing guide tubes by welding to other structural elements which connect them, for example to grids. It is a particular object to enable rapid and positive, automatic electrowelding.

SUMMARY OF THE INVENTION

Accordingly, the invention provides a welding device comprising (a) frame arranged to receive the assembly constituted by guide tubes and structural elements and maintaining them in the arrangement wherein they must be welded; (b) at least one welding assembly comprising a carriage provided with means enabling it to be moved over the frame parallel to the guide tubes and comprising at least one welding clamp mounted on the carriage through means enabling it to be moved transversely to the direction of movement of the carriage, and, rotating it between an orientation in which the clamp can pass between two adjacent rows of tubes and an orientation in which it comes to grip a tube at the place of the weld to be formed; and (c) means enabling the application to the clamps of the electrowelding pulses.

In a general case where the tubes are distributed in rows along two perpendicular directions, each carriage will advantageously bear a clamp by means of a table with cross movements in the direction of the rows and the perpendicular direction. Orientation means of the clamp will be provided to bring the latter, from the passage orientation, in two opposite orientations enabling intervention successively on two tubes without translational movement of the clamp.

In order to reduce the manufacturing time of a skeleton, several welding units may be provided. In the case of tubes distributed along two perpendicular directions, four units arranged at 90° to one another will advantageously be provided in order to weld the tubes along two sets of longitudinal lines also at right angles.

The pressure exerted by the welding clamp on a tube risks deforming it. To avoid this risk, the welding device according to the invention can be completed by means enabling the placing in guide tubes, at the level of the structural elements, of mandrels to be brought into contact with the wall of the guide tubes by radial expansion so as to reinforce the guide tube locally.

According to another aspect of the invention there is provided a method of welding nuclear fuel assembly guide tubes to structural elements distributed along the guide tubes, including the steps of preassembling all guide tubes and structural elements on the frame and moving along the frame, parallel to the guide tubes, at least one electric resistance welding clamp to bring it to the level of the welds to be formed on a structural element. The clamp is moved transversely to the direction of the guide tube while keeping it in an orientation in which it can pass between two adjacent guide tubes. The clamp is then rotated around the direction of transverse movement to bring it into engagement on the guide tube at the place of a weld to be formed; the clamp is closed and an electrical welding pulse is sent therein; the clamp is brought back to its original orientation, and the sequence is initiated again on another guide tube.

The method and the device which have just been defined have numerous advantages over prior art solutions. It is possible to secure, in a single sequence of movement of the clamp or clamps, all of the guide tubes of the skeleton to a structural element; all the guide tubes and the associated structural elements remain in a fixed position during welding, the risk of untimely movement is averted; the group of operations can easily be automated and permanent supervision can be carried out.

BRIEF DESCRIPTION OF THE DRAWINGS

The invention will be better understood on reading the description which follows of particular embodiments of the invention, given by way of example with reference to the accompanying drawings.

DETAILED DESCRIPTION OF PREFERRED EMBODIMENTS

Figure 1:
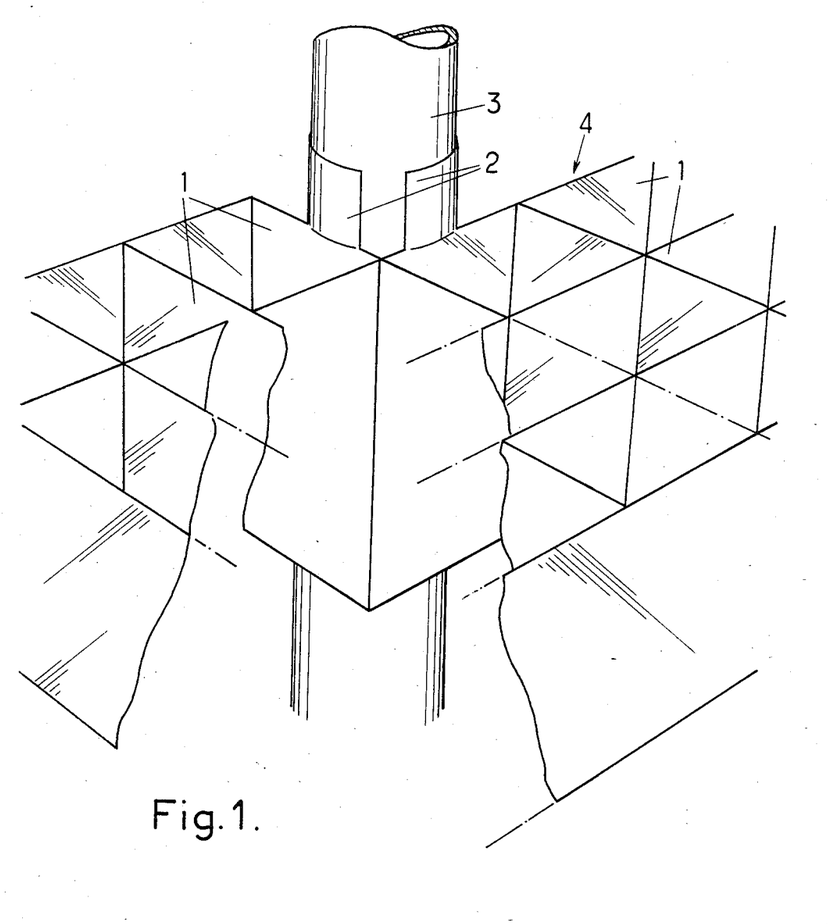
FIG. 1 is a schematic diagram in elevation showing a grid fragment on which the guide tube is fixed.

The device which will now be described, by way of particular embodiment, is intended to fasten together the guide tubes of a fuel assembly and grids provided for this purpose with tongues. FIG. 1 shows a fragment of the grid 4, constituted of plates 1 formed with projecting tongues 2 which contact a guide tube 3. The guide tube and the plates are generally made of one of the zirconium base alloys called "zircaloy".

The welding operation proper, intended to constitute the assembly "skeleton" or framework, is preceded by a pre-assembly of the structural parts in order to place them in the arrangement wherein they will subsequently be welded.

Figure 2:
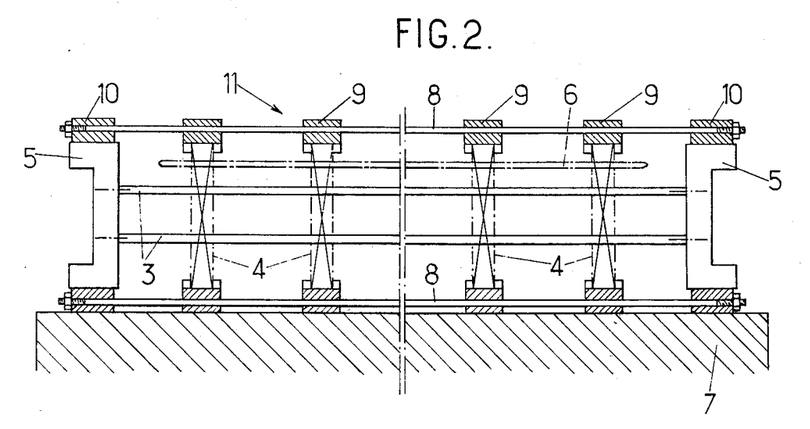
FIG. 2 is a diagrammatic view in elevation showing an assembly bench designed for the pre-assembly of the structural parts of a fuel assembly.

FIG. 2 shows diagrammatically a mounting bench 7 on which the pre-assembly can be carried out. This bench 7 includes a receiving support for pre-positioning tooling 11 formed by swingable clamps 9 and 10, connected by bracing rods 8. The grids 4, the guide tubes 3 and the end part 5 to which the guide tubes 3 are temporarily fixed, for manufacturing purpose, are placed in position in the tooling 11. The length of the bracing rods 8 is such that the clamps 10 are at the same longitudinal level as the end parts 5 while the clamps 9, four in number in the embodiment illustrated, are at the level of grids 4. Thus, the grids 4 and the end parts 5 can be tightly retained by the clamps of the tooling 11 so as to constitute an assembly which can be handled as a unit. By way of illustration, the location of a fuel element 6 has been shown in dot-dash lines in FIG. 2, but in reality the fuel elements 6 are only placed in position in the grids after the latter are welded to the guide tubes 3.

Figure 3:
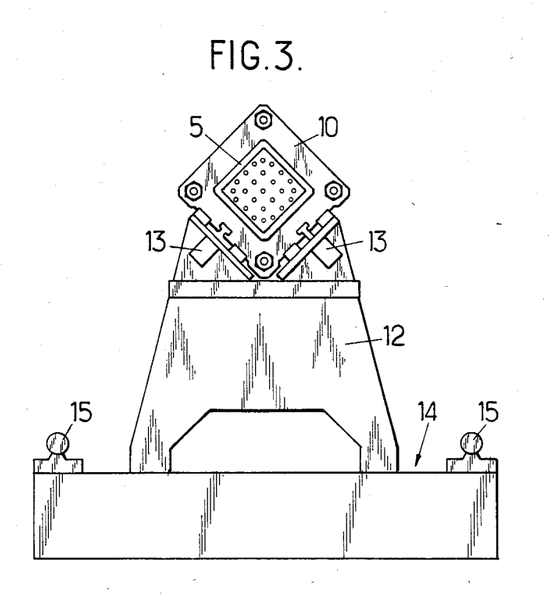
FIG. 3 is an end view of the frame of a device according to the invention with an assembly framework after pre-assembling.

The device according to the invention comprises, in the particular embodiment which will now be described, a stand 12, shown in FIG. 3, designed to receive the assembly constituted by the fuel assembly framework and its positioning tooling. The stand bears clamping jacks 13 for rigidly securing at least one of the clamps 10 of the tooling to the stand. The device further comprises a bed frame 14, formed, for example, by a welded unit, provided with guide rails 15. The stand 12 is fixed to the bed frame in an orientation such that the guide rails 15 are parallel to the guide tubes of a framework borne by the stand.

Figure 4:
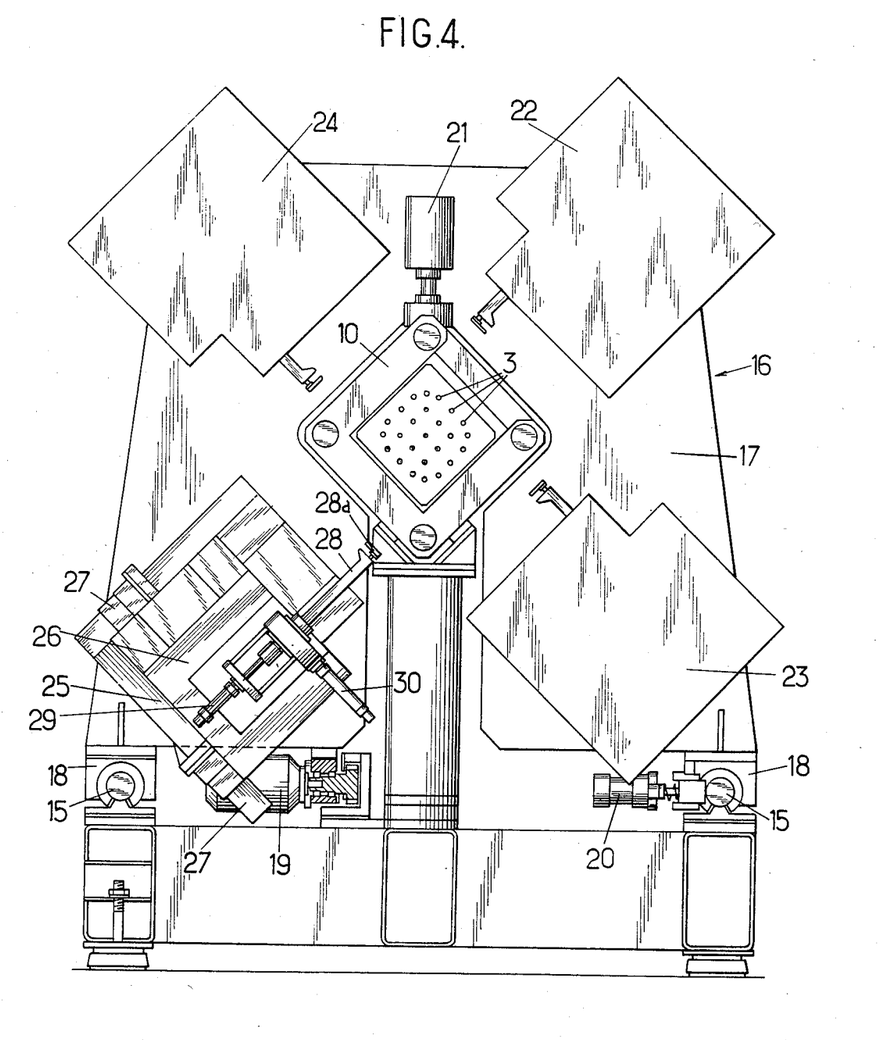
FIG. 4 is an end view showing the movable welding equipment straddling the framework mounted on its receiving stand.

The device comprises also a mobile welding equipment 16, shown as a whole in FIG. 4. This equipment comprises a carriage 17, which will generally be a welded unit, provided with guide bearings 18 on rails 15, on which are placed four welding assemblies 22, 23, 24, 25, the first three of which are only shown in FIG. 4 in outline, for greater simplicity.

The carriage 17 is provided with means enabling its movement on the rails 15 along the stand 12, constituted by a motor 19 for driving a pinion which meshes with a rack fast with the stand 12. Carriage 17 carries in addition means enabling it to be retained accurately and positively at the work sites of the welding units 22 to 25. In the case illustrated in FIG. 4, the retaining means are constituted by a jack 20 borne by the carriage and capable of applying a brake shoe to one of the rails 15. To enable adjustment of its position before welding, the carriage 17 is provided with measurement means, which can include a rule (not shown) fixed to the stand 12 and detection means, for example magnetic, also not shown. The carriage 17 is equipped with centering means constituted, in the embodiment illustrated, by a jack 21.

The four welding units 22 to 25 have the same construction. The unit 25 shown in FIG. 4 comprises a table 26 with crossed movements enabling the weld clamp 28 to be moved in two directions X and Y, the constitution of which can be conventional. The movements are for example ensured by stepping motors 27. The spot welding clamp 28, which will be described in detail below, is provided with a jack 29 for moving the jaws of the clamp toward each other and provided with a force detecting sensor, and with a double-acting jack 30 for rotating the gun enabling the head 28a of the gun to be given three angular positions at 120° from one another. A detector associated with the clamp, advantageously of magnetic type, can be provided to detect the arrival of the clamps in their predetermined orientation.

Figure 5:
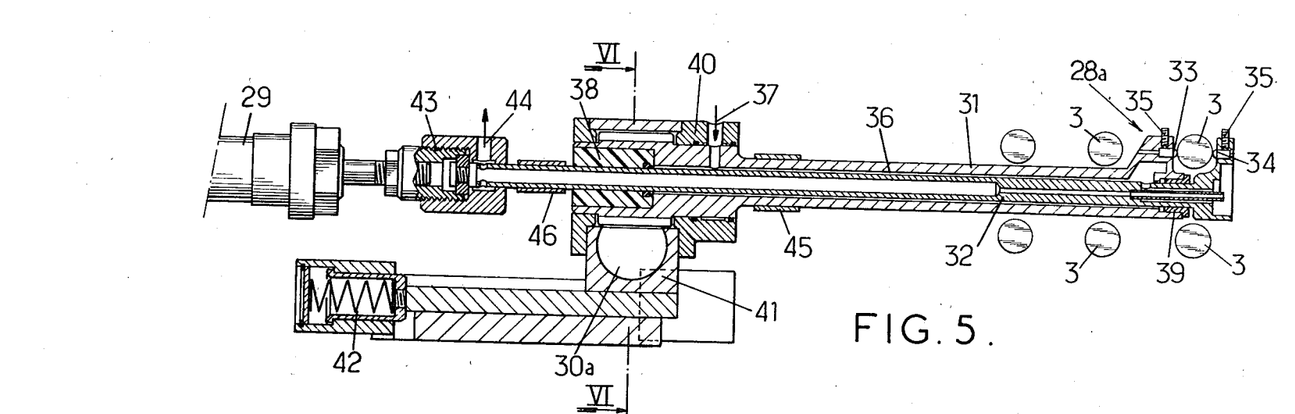
FIG. 5 is a longitudinal sectional view of a welding clamp unsable in the equipment of FIG. 4.
Figure 6:
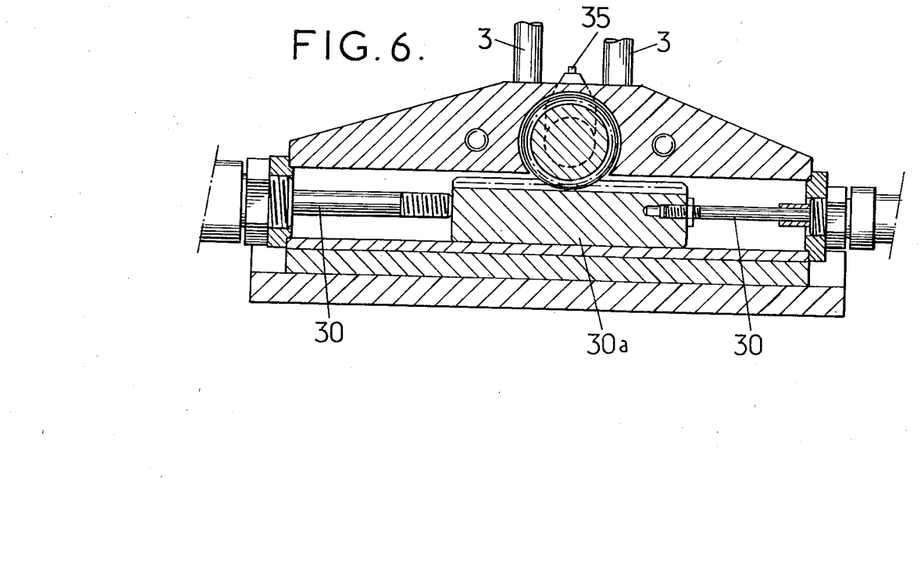
FIG. 6 is a diagram showing the terminal portion of the clamp, in section along the line VI—VI of FIG. 5.

It is possible to use spot welding clamps of numerous different types. The clamp shown by way of example in FIGS. 5 and 6 is water cooled and permits a high operating rate. This clamp 28 can be regarded as having a rod, of sufficiently small cross section to pass between two adjacent rows of guide tubes 3, and a head 28a, of also rather small width so that it can pass between two rows of guide tubes when in a suitable orientation. The clamp comprises two coaxial tubular arms 31, 32, whose bulged ends constitute the head and bear dismountable electrodes 33 and 34, fixed by any suitable means, such as screws 35.

The annular space 36 between the arms 31 and 32, the radial holes formed in the arm 32 in front of the head, and the central bore of the arm 32 constitute a cooling circuit which can be connected, through holes 37 and 44 provided in connecting sleeves 40, 43 and flexible members (not shown) to a water supply circuit, (not shown). The tubular arms serve for the electrical supply of the electrodes and hence must be insulated from one another. To this end, the centering bearings 38 and 39 of the arms are constituted by insulating materials.

The outer arm 31 is free to rotate in the sleeve 40, but retained by it against translational movement. To enable the outer arm 31 to move axially upon clamping and unclamping of the gun, the sleeve 40 is not fixed directly to the table 26, but borne by a slide 41 slidable on the table 26. An elastic stop 42 tends to restore the arm to rest position, shown in FIG. 5. The slide 41 contains the double-acting jack 30 for orienting the gun, as will be seen below.

The penumatic clamping jack 29 is connected to the inner arm 32 through a coupling connector comprising the sleeve 43 and enabling replacement of the gun. The arms 31, 32 are provided with electrical connecting parts 45, 46 enabling current pulses to be applied to the electrodes, from an external source (not shown). In FIG. 5, the gun 28 is shown in welding position on a guide tube 3. This head has a shape enabling it to rock from a position where it passes between two adjacent rows (FIG. 6) to a position where it frames a guide tube without being hampered by the adjacent guide tubes (FIG. 5).

We will come back below to the operating sequence of the device. At this point, it can however be noted that the clamping of the gun is carried out in the following manner:

The jack 29 moves the arm 32 until the electrodes 34 comes into contact with the tongue 2, already in contact with the guide tube 3. Due to the fact that the sleeve 40 connected to the arm 31 is floating on the slide 41, a back reaction to the traction force developed by the jack 29 is generated and, due to the elastic stop 42, the arm 31 is moved in opposite direction to the arm 32 until the electrode 33 is in contact with the tongue 2 diametrically opposite the tongue 2 in contact with the electrode 34.

The elastic stop 42 hence enables an identical clamping force (normally of the order of 15 kg) to be obtained on the diametrically opposite longitudinal lines of the guide tube which is to receive the spot weld for connection with the tongue 2.

In FIG. 6, the method of rotating the rod and head of the gun 28 appears more clearly. The two jacks mounted on the slide 40 (which can be replaced by a double acting jacks) drive a rack 30a which engages a toothed wheel fixed rigidly to the arm 31. The course of the rack is such that it can rotate the arm 32, as well as the arm 31 which is fast in rotation therewith, over 120° from the middle position shown in FIG. 6, to bring the head into the working position shown in FIG. 5.

Figure 7:
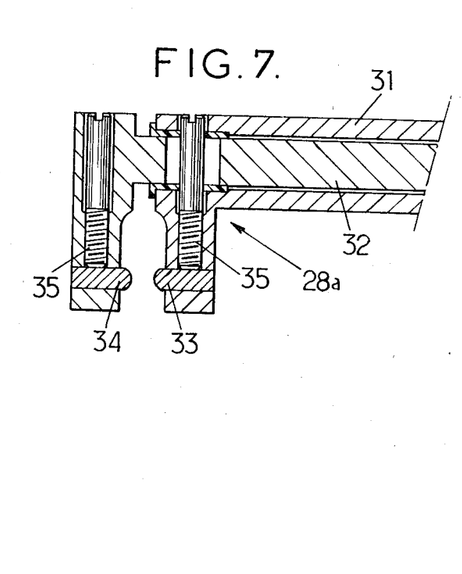
FIG. 7 is a detailed view showing a modification of the welding clamp in axial section.

FIG. 7 shows a modification of a welding gun without water cooling. The same reference numerals are used and it is seen that only the method of fastening of the electrodes differs. In fact, the fastening of the electrodes is effected by means of screws 35 passing through a threaded bore toward the thickness of the part. This modification permits a gain in dimensioning, since the screws do not project and provide greater safety of screwing, due to a greater range of threading.

Considering that the guide tubes have a small thickness, it is desirable to support them during the welding operation to avoid their deformation under the pressure of the electrodes. A simple solution consists in introducing, into the guide tubes in the course of welding, retaining mandrels.

Figure 8:
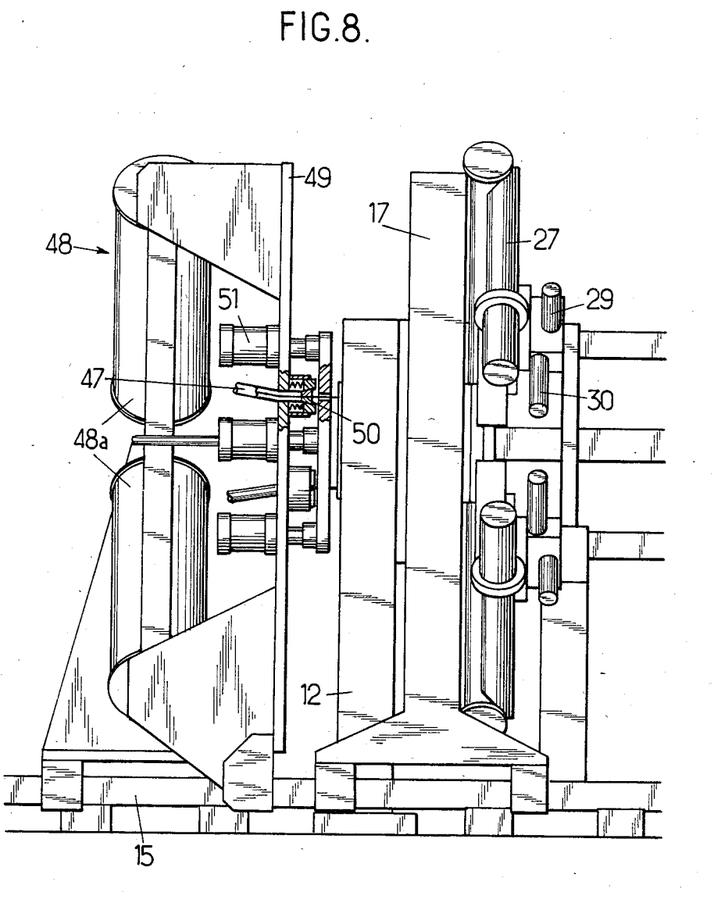
FIG. 8 is a view, in elevation and in partial section, of an equipment for the insertion of expandable mandrels into the guide tubes, FIG. 9, similar to FIG. 8, shows a modification not including flexible elements.
Figure 9:
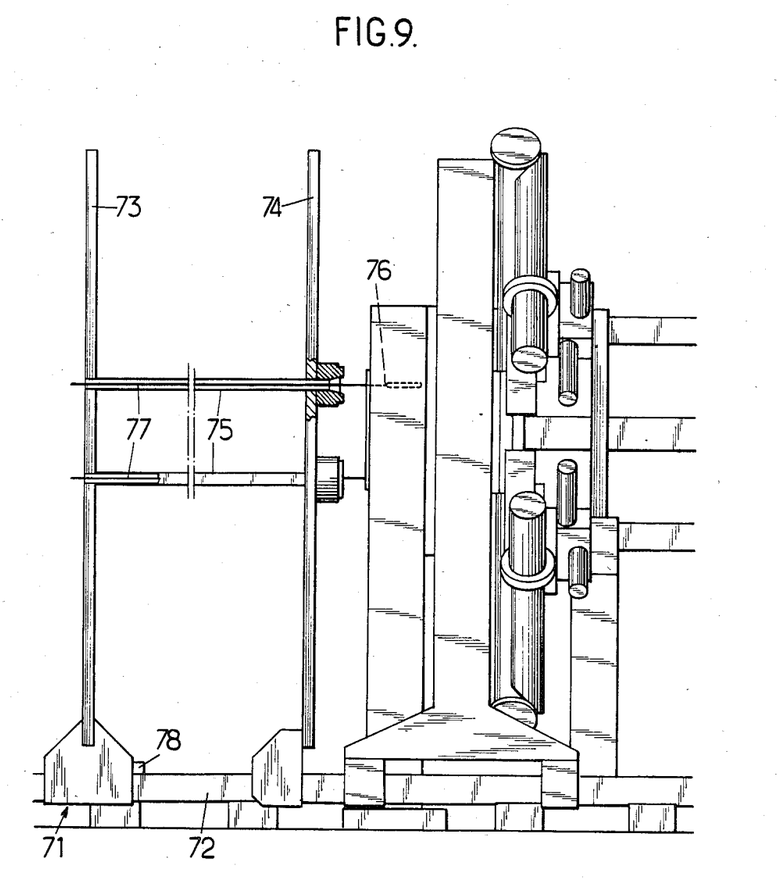

FIGS. 8 and 9 show equipments enabling the introduction into the guide tubes of expandable mandrels, their positioning in line with the grids, i.e., at the welding locations, and then their application against the tubes. These mandrels prevent not only the deformation of the guide tubes, but also thermal unbalances between the two opposite welding spots.

In the embodiments shown, the equipment for introducing the mandrels constitutes an autonomous unit. In the case of FIG. 8, it is borne by a carriage 49 moving over the guide rails 15 of the bed frame 14. This carriage 49 and the carriage 17 bearing the welding unit will be situated, on the stand 12, on either side of the end part supporting the positioning tooling 11. The carriage 49 is provided with driving and immobilizing means (not shown) which can be similar to those of the carriage 17.

In the embodiment shown in FIG. 8, the mandrels are placed in position by means of several flexible units 47 stored on a multiple winder 48 borne by the carriage 49. The winder 48 is composed of several drums 48a rotating around parallel axes, rotated by a motor reduction unit through a double synchronizing bearing, which may be of any conventional type.

The step-by-step advance of the flexible units and of the mandrels can be controlled by clamps 50 provided with a clamping control and jack advancing mechanisms 51 enabling each clamp to grip the flexible element, to advance it by one step, to release the flexible element and to return to its starting position.

The number of flexible elements is the same as that of the guide tubes, twenty-four, for example. It may happen that one (or more) of the guide tubes are accessible only from the end part opposite carriage 49. In this case, the corresponding mandrel control device must be placed opposite the carriage 49 on the stand 12.

In the modification shown in FIG. 9, the mandrels are placed in position by hollow rods 75. The drive mecanism of these hollow rods comprises a carriage 71 provided with a drive motor (not shown) enabling it to be moved over a path 72 parallel with the rails 15. The carriage 71 bears two tubular plates 73 and 74, the holes of which have the same distribution as those of an end part 5 of the assembly. On these plates are fixed hollow and rigid rods 75 equal in number to that of the guide tubes. Each rod 75 bears, at its ends 76, an expandable mandrel.

The carriage 74 must be provided with a marking device 78 enabling the location of the mandrels to be determined precisely and their positioning in line with the grids to be welded.

The expansion of the mandrels in line with the grids can be ensured by a central control device, designated by 77 in FIG. 9 and not shown in FIG. 8.

Figure 10A:
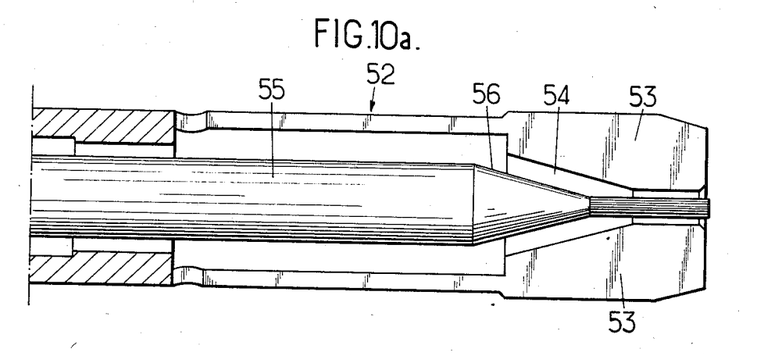
FIGS. 10A and 10B show, respectively in section along the axis and from the right, the terminal portion of an expandable mandrel usable in the equipment of FIG. 8, FIG. 11, which corresponds to a fragment of FIG. 4, shows the arrangement of the guide tubes to be welded and the marks enabling the welding sequence to be defined.
Figure 10B:
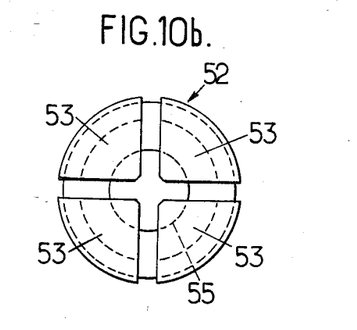

The expandable mandrels may have very varied constitutions. In the case illustrated in FIGS. 10A and 10B, mandrel 52 is constituted by an axially split tube to constitute several elastic fingers 53, also distributed angularly, generally four in number. The fingers define an inner surface 54 which is flared outwardly. A central rod 55, of which the terminal portion has a profile 56 complementary to that of the fingers, is provided at its remote end with means enabling it to be advanced towards the fingers 53 in order to separate the latter and to bring them into contact with the guide tube when the fingers are in line with the welding clamp. So that the mandrel 52 may ensure a satisfactory mechanical support and a good electrical contact, the outer surface of the fingers 54 is machined so that it is positioned on the circle corresponding to the inner channel of the guide tube when the mandrel is expanded. This method of constituting the mandrel enables it at the most to pass more easily in line with the grids, due to the reduced radial bulk.

Means designed to reinforce the guide tubes during welding may have very different constitutions from those which have been described in referring to FIGS. 7 to 10. There may particularly be used a hydraulic, pneumatic, mechanical or even electrical control. The mandrels may have a shape distinct from that described above. They may include a ring of electrically conducting material constituting an intermediate electrode. Finally, it is possible to use, instead of an expandable mandrel ensuring local support, in line with a grid, a single tube comprising several expandable zones distributed along an arrangement reproducing that of the grids, held in position in a guide tube throughout the operation welding of all grids.

There will now be described, by way of example, with reference to FIG. 11, the successive operations during a complete welding sequence of the set of guide tubes on a given grid.

Figure 11:
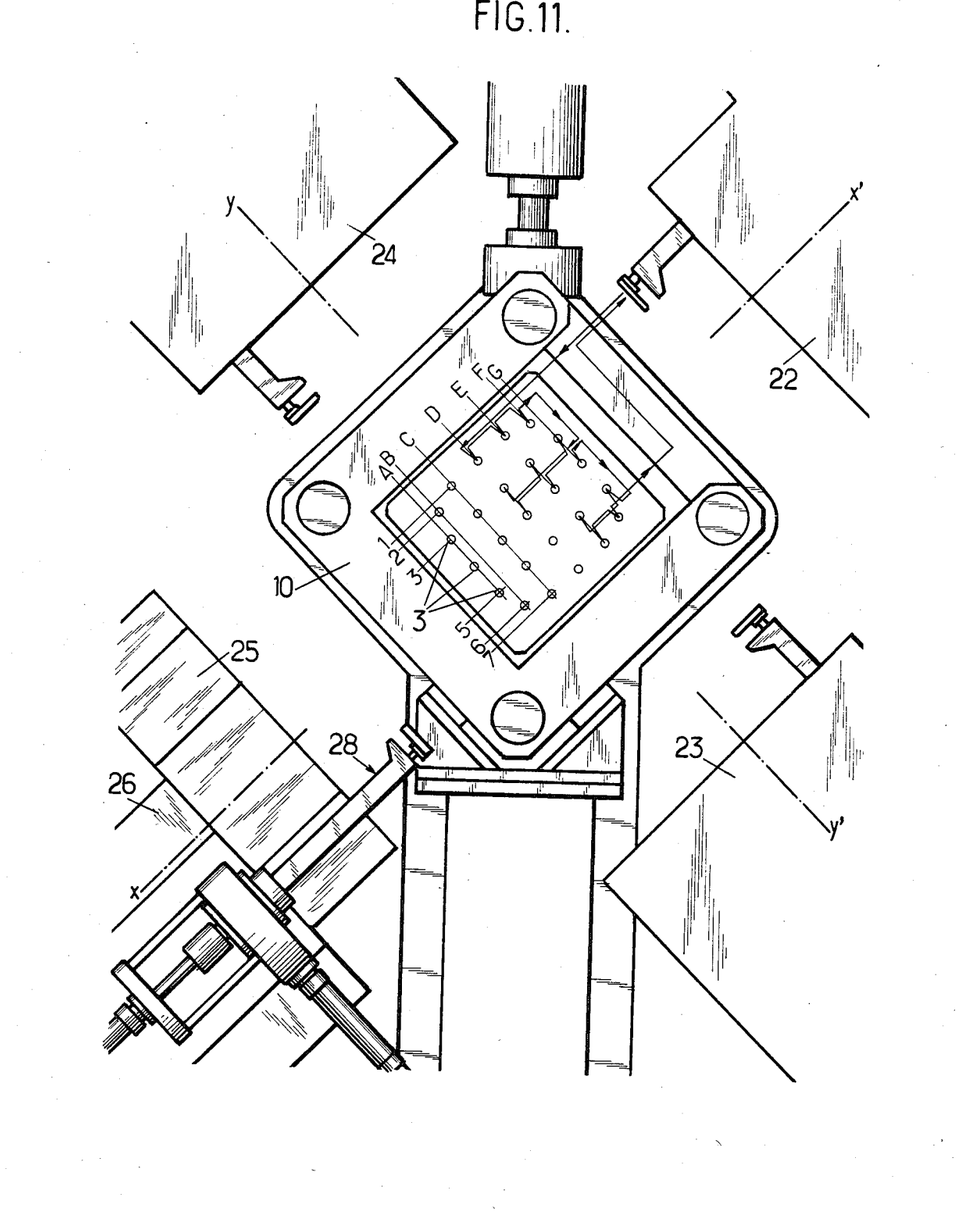

It will be assumed that, initially, the framework pre-assembled in the tooling is placed on the stand 12, that the mandrels have been introduced into the guide tubes and placed in line with the grid to be welded, that the carriage 17 has been brought into a working position on the grid, the clamps 28 being retracted to the locations indicated in FIG. 11. This arrangement is that shown in FIG. 11.

The sequence may be as follows:

(a) The four clamps 28 are positioned, by means of jack 30, in the orientation of introducing into the network of guide tubes (head parallel to the axis of the guide tubes).

(b) The motors of the cross movement tables 26 are actuated to bring the clamps 28 to the height of the first guide tubes to be welded. In FIG. 11, the clamps of the units, 22, 23, 24 and 25 are slid parallel to the rows of guide tubes, outside the bundle, to come in line with the guide tubes situated in D1, G4, A4 and D7, respectively, in an orientation which is that shown in FIG. 6.

(c) All the welding guns are tilted 120° to the left, which brings the electrodes of the guns onto the tongues situated in direction XX' for the tubes D1 and D7, along YY' for the tubes situated at G4 and A4.

(d) The jacks 29 are actuated to bring the electrodes 33 and 34 into contact with the tongues.

(e) The pulse generator (not shown) is actuated so as to provide current pulses of which the voltage, the intensity and the duration have been previously determined by welding of specimens.

(f) The four guns 28 are tilted rearwards 120° to bring them back into their initial position.

(g) The four guns are moved to advance them one step towards the guide tube: the clamps of the units 22, 23, 24 and 25 thus come respectively opposite the guide tubes situated at E1, G5, A3 and C7.

(h) The sequences (c), (d), (e) and (f) are repeated.

After a further advance, this time by a half step, the operations (c), (d), (e) and (f) are repeated to weld the guide tubes situated at the corners.

These operations, carried out on the guide tubes placed at the periphery of the bundle, must be completed by the welding of the tubes arranged inside the bundle. The successive operations are again similar, except that the gun, once introduced, may be tilted alternately from one side and then on the other when the guide tubes placed on both sides of its introduction position are to be welded.

Rather than describe the complete sequence of operations, there is indicated diagrammatically in FIG. 11, by arrows, the operation of the gun of the welding unit 22, it being of course understood that other paths are possible.

We claim:

1. Device for welding a plurality of guide tubes of a nuclear fuel assembly to structural elements distributed along the guide tubes to constitute a skeleton, said device comprising (a) a stand arranged to receive a plurality of spaced guide tubes arranged in spaced apart parallel rows separated by intervals and structural elements and having clamping means to hold said guide tubes and structural elements in a predetermined mutual arrangement wherein they must be welded to constitute a skeleton and in a predetermined position with respect to said stand;

(b) at least one welding unit comprising a carriage arranged for movement on said stand in a direction parallel to said guide tubes and at least one welding gun having a shape such that it may be introduced into one said interval between two adjacent ones of said rows in a first angular position only, said at least one welding gun being mounted on said carriage by means constructed and arranged for moving said gun rectilinearly in a direction parallel to said rows of guide tubes and perpendicular to said guide tubes and in rotation between said first angular position and a second angular position in which it straddles one of said guide tubes at a location of a weld to be made; and (c) means for applying electrical welding pulses to said at least one welding gun.

2. Device according to claim 1, for welding guide tubes distributed in rows along two perpendicular directions, wherein each welding gun is borne by its carriage through a table with cross movements along the direction of said rows.

3. Device according to claim 2, comprising four said welding guns borne by the same carriage by means of a table with respective cross movements.

4. Device according to claim 1, wherein the means for rotating said welding gun are provided to bring the latter from the orientation of passage between adjacent rows, into two symmetrical orientations enabling the welding of two guide tubes without movement of said gun in translation.

5. Device according to claim 1, further comprising means for introducing into said guide tubes expandable mandrels at least locally to support said guide tube at the welding locations.

6. Device according to claim 5, wherein the means associated with said mandrels comprise flexible elements for moving said mandrels along said guide tubes and step-by-step advancing means for said flexible elements.

7. Device according to claim 1, further comprising a receiving bench for a tooling for pre-positioning said guide tubes and said structural elements, said tooling comprising tilting mobile clamps connected by bracing rods so as to constitute an assembly transportable as a unit on said stand.

8. Device according to claim 1, wherein said at least one welding gun comprises two coaxial tubular arms, provided with respective electrodes placed face to face, one of said arms being mounted on a carriage by resilient return means enabling it to move axially from a rest position and means for moving said arms axially with respect to one another and to apply said electrodes in a balanced manner to said tube.

9. Device for welding a plurality of guide tubes of a nuclear fuel assembly to grids distributed along said guide tubes, said device comprising:

(a) a stand constructed to receive a skeleton constituted by a plurality of non-contacting tubes arranged in spaced apart parallel rows and by a plurality of grids distributed along said guide tubes and to hold said guide tubes and grids in a mutual arrangement wherein they are to be welded;

(b) at least one welding unit comprising a welding gun, a crossed movement table carrying said welding gun and arranged for movement of said gun in a direction parallel to said rows and perpendicular to said guide tubes and in a direction transverse to said rows and perpendicular to said guide tubes; and (c) a carriage carrying said crossed movement table and provided with indexing means for moving said carriage along said stand parallel to said guide tubes, said gun being carried by said table through means constructed to rotate said gun about an axis parallel to said direction parallel to said rows between a first angular position wherein said gun is insertable between two adjacent rows of said guide tubes and at least one other angular position wherein electrode means of said gun straddle one of said guide tubes at a location of a weld to be made; and (d) means for applying electrical welding pulses to said welding gun.

10. Device according to claim 9, wherein said electrode means comprises a first electrode fast with a radially outer elongated member connected to said table through said indexing means and resilient means, a second electrode fast with a radially inner elongated member coaxial with said radially outer member and axially movable with respect thereto, said gun having fluid pressure means for biasing said members toward each other, whereby said electrodes are applied against a guide tube to be welded with balanced forces.

11. Method of welding a plurality of guide tubes of a nuclear fuel assembly to structural elements distributed along said guide tubes, said method comprising mounting the group of said guide tubes and structural elements, pre-assembled by a tooling, on a stand; moving a welding gun transversely to the direction of said guide tubes by holding said welding gun in an orientation in which it can pass between two adjacent ones of said guide tubes; tilting said gun about its direction of transverse movement to bring it into engagement on a particular one of said guide tubes at the location of a proposed weld; closing said gun and sending an electrical welding pulse therein; returning said gun its original orientation and recommencing the sequence on another one of said guide tubes.

* * * * *